Sept. 28, 1965      C. W. HENSCHEN      3,208,168

UNIVERSALLY CUSHIONED DUAL DRIVE MECHANISM

Filed Jan. 14, 1963      2 Sheets-Sheet 1

INVENTOR.
CURTIS W. HENSCHEN

BY

Attorneys

INVENTOR.
CURTIS W. HENSCHEN
BY
Attorneys

3,208,168
UNIVERSALLY CUSHIONED DUAL DRIVE MECHANISM
Curtis W. Henschen, % Henschen Industrial Corp., Jackson Center, Ohio
Filed Jan. 14, 1963, Ser. No. 251,174
8 Claims. (Cl. 37—97)

This invention relates to dual drive power transmitting mechanisms and, more particularly, to dual drive mechanisms for receiving rotary power and transmitting it to a rotary driven member such, for example, as a ditch digging wheel, comprising a cylindrical supporting wheel having shovels or scoops positioned at substantially uniformly spaced intervals on the wheel's outer periphery. The power drive mechanism of the invention is constructed to absorb shock torque loads encountered by the rotary driven member and also to accommodate and absorb abnormal shocks other than pure torque loads caused by resistance forces imposed unsymmetrically or other than purely circumferentially on the rotary driven member so as to momentarily subject one side of the dual drive mechanism to a greater torque load than the other side thereof and/or so as to subject one or both sides of the dual drive mechanism to severe linear, transverse or radial loads.

The general mechanical problem to which the present invention is directed may conveniently be explained by reference to ditch digging machines in which the problem exists to an aggravated degree. A number of ditch digging apparatuses which generally fall into the class known as "ditchers" function primarily through the use of a wheel having spaced shovels located on its outer periphery. In operation, the ditcher is continuously urged in the direction in which the excavation of the ditch is to proceed. During this urging, the wheel is revolving by means of power exerted through a power transmitting system.

Any large stones, boulders, or the like, or other zones of increased resistance that are encountered by the digging wheel of a ditch digging machine may impose lateral forces, as well as tangential and radial forces, on the periphery of the wheel. These forces may be of considerable magnitude and may be suddenly applied as shock loads in a non-symmetrical manner on the periphery of the wheel, tending to twist it out of shape and/or out of alignment relative to its normal axis of rotation, or tending to move it linearly and transversely relative to the axis of a power input shaft drivingly coupled thereto. These forces must be resisted solely by the mounting of the wheel on some kind of axle or equivalent mounting, unless some provision is made for such forces to be resisted in part by the wheel driving mechanism, which commonly comprises a driving pinion engagng an annular rack that is coaxially mounted on the wheel near its periphery for maximum mechanical advantage.

As an aid in maintaining alignment of the digging wheel with its intended axis of rotation and with the power input shaft drivingly coupled thereto, it is feasible to employ two drives of the type described, powered from a common source. This may be done by splitting the power from a common power source between two torque transmitting drives coupled to opposite sides of the digging wheel by means of separate pinion and rack driving connections. This splitting of the driving force between a pair of racks that are axially spaced apart on opposite sides of the wheel provides laterally spaced driving force vectors adjacent opposite sides of the shovels or scoops, instead of a single vector at the center or adjacent one side of the periphery of the wheel. Such a dual drive aids in maintaining alignment of the wheel in opposition to the several kinds of shock loads commonly imposed upon the shovels or scoops during their digging operation.

A result of using a dual drive of the type described, however, is that the same variety of shock loads imposed on the driving wheel which the dual drive is designed to counteract cause severe transverse and/or radial loading, as well as torque loading, of the driving gears, often with considerable imbalance in the distribution of the total loads between the two driving pinions and in the torques required to drive them. Thus, the driving pinions and whatever corresponding drive mechanisms may be employed to drive them both from a common source of power are subjected to large and often unequal transverse and/or radial loads as well as large and often unequal torques, and one or the other of the pinions and its separate drive mechanism may be momentarily called upon to share of one or another or all of the variety of kinds of shock loads imposed on the wheel by the shovels, or scoops. All of this is apt to overload or damage one side or the other of the dual drive and requires that extra strength and ruggedness may be designed into both sides. Morever, even though there is no unbalance in the shock loads, the common source of power must be designed with sufficient strength and ruggedness to absorb the total shock and vibration without damage over long periods of service and supply the total torque required to overcome the resistance to continued rotation of the digging wheel.

The important requirements of the dual drive type of power transmitting mechanism as applied to driving the digging wheel of a ditching machine, therefore, are: (1) ability to transmit any required normal driving torque uniformly to both sides of the digging wheel in supplying the varying torque requirements of the digging wheel as it encounters varying ground conditions; (2) ability to transmit the required different torques to the two sides of the dual drive when the normal balance of the demand between the two sides of the dual drive is upset by unsymmetrical digging forces on the digging wheel, particularly unsymemtrcial shock loads; and (3) ability of the entire mechanism back to the common source of power to absorb the total, torque and variety of other shock loads encountered.

The principal object of the present invention is to provide an improved dual drive system which will effectively aid in counteracting unbalanced loads on large rotary members, such as the digging wheels of ditching machines and the like while, at the same time, minimizing the extent to which opposite sides of the dual drive and the drive system as a whole will be subjected to the various kinds of shock loads which might otherwise damage the drive system.

More specifically, it is an object of the invention to provide a dual drive of the type described in which independent shock absorbing components in both sides of the dual drive system act to absorb shock loads, whether balanced or unbalanced and whether in the nature of torque loads or transverse or radial loads, so as to protect both sides of the drive and the drive system as a whole from the effects of the shock loads without interfering with the division of the driving torque between opposite sides of the dual drive under all conditions of operation Further objects of the invention are to accomplish the foregoing without undue complication of the drive system from the use of elaborate shock absorbing units, such as hydraulic or magnetic drives or the like, and to provide the sought-for improvements in a mechanism that is inexpensive to manufacture, rugged in construction, and durable in use with a minimum of service and maintenance being required.

In general, the foregoing objectives are accomplished by employing a novel type and arrangement of resilient couplings on each side of the rotary-driven member between two rotary driving members and a common power input shaft by which both of the rotary-driving members are driven. Although the invention is not intended to be limited thereto, I preferably use, as the resilient coupling in each side of the dual drive, the particular type of coupling, employing resilient roller cushions, that is disclosed and claimed in U.S. Patent No. 2,712,742 of Hermann J. Neidhart. This particular form of resilient coupling has a number of attributes that make it especially suitable for the purposes of this invention, as will appear hereinafter in a more detailed description of the same.

For a more complete understanding of the invention in its various forms and how it may advantageously be employed in practice, several figures disclosing a preferred form of the invention are shown in the accompanying drawings, for illustrative purposes, as applied to a ditching machine. Numerous modifications thereof for other specific applications will occur to those skilled in the art, and such modifications are contemplated as falling within the scope of the invention as herein described and claimed.

Referring to the drawings:

FIG. 3 is a similarly enlarged plan view of disassembled component elements of the apparatus of the instant invention;

Figure 2:
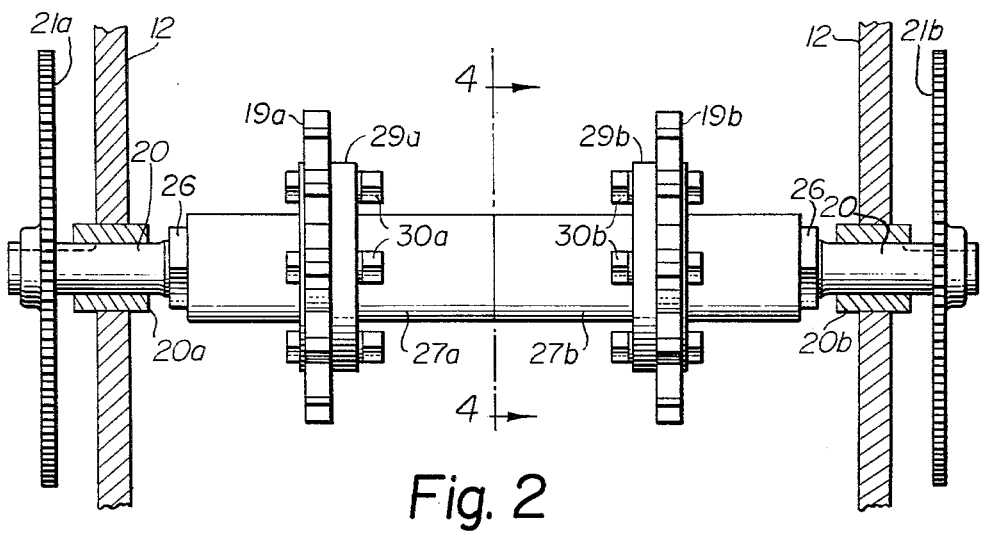
FIG. 2 is an enlarged plan view of the power transmitting or drive mechanism of the instant invention.
Figure 4:
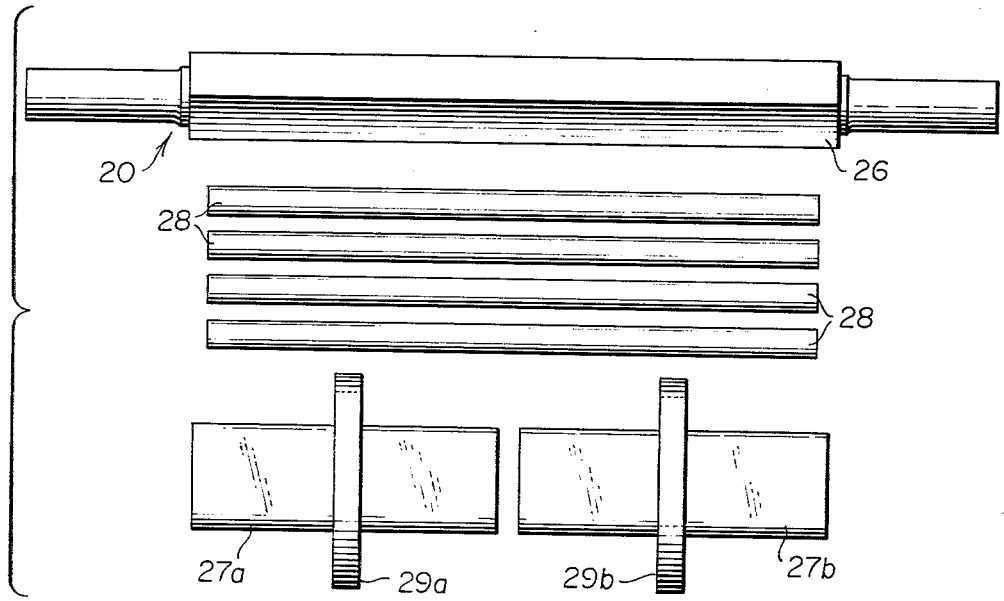
Figure 5:
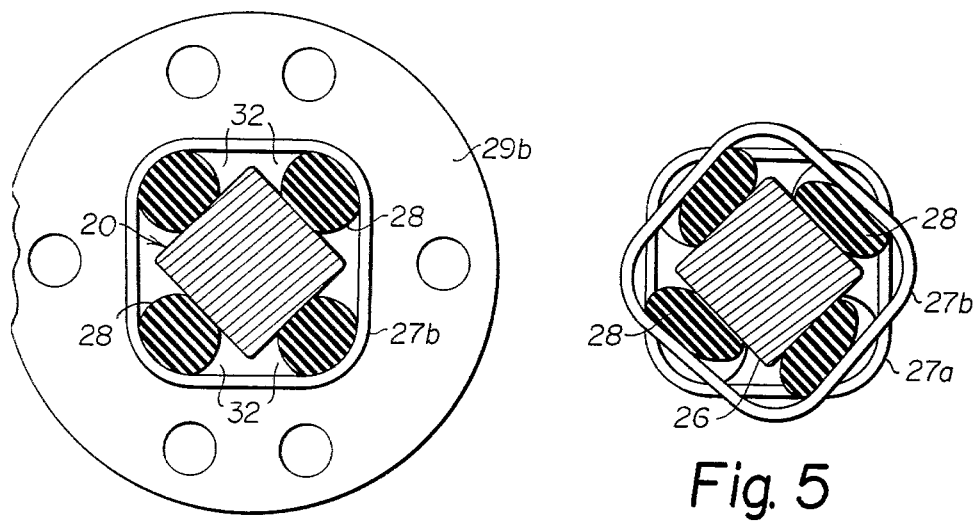

FIG. 4 is a similarly enlarged, vertical sectional view of a portion of the drive mechanism, taken as indicated by the line 4—4 in FIG. 2 and showing the elastic cushions disposed between the central shaft of square cross section and the coaxially surrounding outer member of square cross section; and FIG. 5 is a fragmentary view similar to FIG. 4 which shows the device after relative rotation of the inner and outer members under torque.

Figure 1:
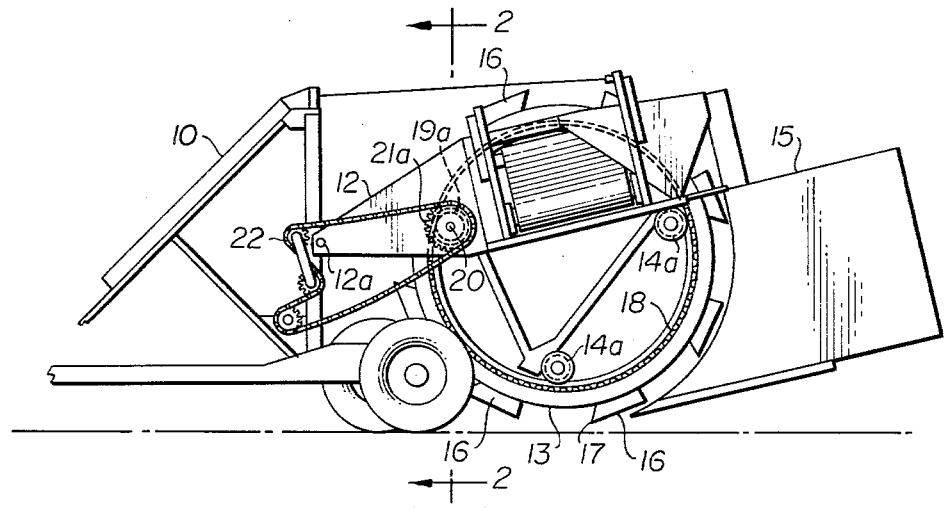
FIG. 1 is a partially schematic, partially detailed view of a ditch digger of the character referred to above, showing the location of the power input shaft and its relation to the system for transmitting power therefrom to the cylindrical ditch digging wheel.

Referring to FIG. 1, there is shown a ditcher comprising a main supporting frame 10 mounted on a trailer chassis 11; a movable frame 12 pivotally mounted at 12a on the main frame 10 for raising and lowering the digging mechanism in a more or less conventional manner; and a digging wheel 13 mounted on the movable frame. Three bearing rollers 14a (only two being visible in the drawing) are mounted in a uniformly spaced, circular array on the movable frame for rotatably supporting the digging wheel thereon. The movable frame also optionally carries a tile laying chute 15.

The digging wheel 13 is of a generally cylindrical shape having shovels or scoops 16 disposed at spaced locations about the outer periphery of the wheel with leading edges 17 of the scoops facing in the direction of rotation of the wheel. Mounted on opposite sides of the cylindrical digging wheel are annular arrays of axially extending gear teeth 18 analogous to a ring gear (only one such array being shown in FIG. 1 on one side of the digging wheel). A pair of drive gears 19a and 19b (only one being shown in FIG. 1 by dotted lines) are coaxially arranged in spaced relationship and in driving engagement with the gear teeth 18. The gears 19a and 19b, both of which are shown in FIG. 2, are preferably mounted on a common power input drive shaft 20 so as to be driven thereby through a pair of interposed, rotary, flexible couplings that are disposed between the shaft 20 and the gears 19a and 19b, respectively, as described below.

A pair of driving sprockets 21a and 21b are mounted on the power input shaft 20 outwardly toward the opposite ends thereof from the gears 19a and 19b. Chain drives 22 (only one being shown) engage the sprockets 21a and 21b, respectively, and transmit power to both ends of the shaft 20 from any conventional power take-off from the towing tractor (not shown). Suitable bearings 20a and 20b may be mounted on the movable frame 12 for rotatably supporting the shaft 20 inwardly thereon from the sprockets 21a and 21b.

Referring to FIG. 2, the shaft 20 is continuous from end to end of the dual drive mechanism and includes a continuous central portion 26 of square cross section. Two coaxially disposed, outer sleeves or tubes 27a and 27b surround an inner member in the form of the square central portion 26 of the shaft 20 (also see FIG. 4) and are of such size in cross section as to be rotatable with clearance about the shaft portion 26 surrounded thereby. Independent rotation of the two sleeves 27a and 27b relative to the shaft 20 is resiliently restrained, as hereinafter more fully described, by a set of rod-like, cylindrical elastic cushioning members 28 (FIGS. 3–5), whereby each of the sleeves may have resiliently restrained and limited rotation about the shaft 20 independently of the other sleeve. The cushioning members also serve to yieldingly support the sleeves 27a and 27b in coaxial alignment with the shaft 20 so as to cushion the shaft 20 from transverse and radial loads imposed on the gears 19a and 19b and permit the gears to be forced out of alignment with the shaft in resisting such loads.

Referring to the sleeve 27a, an annular hub or flange 29a surrounds the sleeve and is fixed thereon for rotation therewith, as by welding, and the gear 19a (previously described) surrounds the sleeve 27a and is secured to the flange 29a by bolts 30a for rotation with the hub 29a and sleeve 27a. The gear 19a, as shown in FIG. 1, meshes in driving engagement with the array of gear teeth 18 on the adjacent side of the digging wheel 13. The second sleeve 27b is similarly provided with a hub 29b and the aforementioned gear 19b secured to this hub by volts 30b. The second gear 19b similarly meshes in driving engagement with the array of gear teeth on the adjacent side of the digging wheel 13, opposite the side on which the similar gear 19a is mounted.

As will be readily appreciated from the foreoing general description of the dual drive mechanism, torque applied to rotate the power input shaft 20 is imparted through the resilient cushioning members 28 to both of the surrounding sleeves 27a and 27b, which are separately connected in driving engagement with opposite sides of the digging wheel through the two gears 19a and 19b. This division of the driving force exerted by the power input shaft, the resilient transmission of the divided torque components to axially spaced opposite sides of the digging wheel 13, and the ability of the two flexible couplings to cushion transverse and/or radial shocks imposed thereon by the digging wheel, provide the type of cushioned, dual drive constituting a principal feature of the invention and achieving the principal objectives thereof as set forth above.

The importance of the cushioning of transverse and/or radial loads on the gears 19a and 19b will be better appreciated when it is noted that the digging wheel is rotatably mounted on a large and inherently, somewhat flexible frame 12 by means of the widely spaced set of three rollers 14a. The sum of the effects of tolerances in the rotatable mounting of the digging wheel on the frame 12 and the flexing, though slight, of the frame under the shock loads imposed on the digging wheel scoops 16 is such as to permit a substantial amount of relative transverse movement of the axis of the drive shaft 20 and the actual axis of rotation of the digging wheel from one moment to the next, and also to permit appreciable canting of the digging wheel out of its normal plane of rotation. That transverse movement results in shock loads on the scoops 16 being imposed radially, as well as circumferentially, on the gears 19a and 19b, and the canting of the digging wheel may also cause transverse (i.e., in the direction of the axis of the shaft 20) loads on the gears and, in addition, can cause greatly unbalanced application of all of the several types of loads (particularly shock loads) on the gears 19a and 19b.

The inner workings and design of the flexible couplings are more easily understood by referring to FIGS. 3, 4 and 5. In FIG. 3, the component parts of both of the flexible couplings are shown unassembled, without the sprockets and gears being mounted thereon.

In the no-load condition of the parts of FIG. 3 when assembled as shown in FIG. 4, each side of the square inner member or inner shaft portion 26 faces an apex between two adjoining sides of the square outer member or sleeve 27b so as to define four longitudinally extending chambers or pockets 32. The cushioning elements 28 of rubber or the like, in the form of the cylindrical cords or rods shown in FIG. 3, extend longitudinally over the combined length of the two sleeves 27a and 27b. These cushioning elements are inserted in the pockets 32, preferably under radial compression between the inner and outer confining members, as shown in FIG. 4, so as to provide an initial, relatively great resistance to relative rotation of the inner and outer confining members. They may be inserted in the pockets 32 while being stretched longitudinally to effect a temporary reduction in their diameter, or they may be forced through funnel-shaped guides (not shown). However, I prefer to precompress them with suitable clamps and subject them to a very low temperature to freeze them in their compressed state, whereupon they may simply be inserted into the pockets 32 and allowed to thaw and expand into pressure engagement with the inner and outer confining members.

As power is transmitted through shaft 20 by rotating it about its axis, the plane surfaces of its square section 26 bear against the cushioning elements 28, which in turn bear against the inner, plane, wall surfaces fo the sleeves 27a and 27b, thereby rotating the sleeves and gears 19a and 19b and driving the digging wheel 13.

As the digging wheel is rotating against the digging resistance encountered, the cushioning elements 28 are compressed proportionately to the amount of the commonly variable torque required to dig through any given ground condition. If the resistance forces encountered by the digging wheel were symmetrically applied thereto and the entire digging wheel and frame assembly were perfectly rigid all of the cushioning elements 28 on both sides thereof would be equally compressed whatever the degree of compression might be and regardless of variations therein, and concentricity of the sleeves 27a and 27b on the shaft 20 would be maintained. However, such is not the case as explained above.

When the digging wheel meets abnormally high and/or unsymmetrical resistance forces so as to be deflected or twisted out of alignment in any manner, there is a much more complex and/or an imbalance in the loading of the gears 19a and 19b occurs as explained above. The differences in torque cause different degrees of compression of the opposite end halves of the cushioning elements 28 within the two sleeves 27a and 27b, respectively and, consequently, cause different degrees of rotation of the two sleeves relative to the power input shaft 20, thus minimizing the torque shock load on either the gear 19a or 19b, whichever one may be subjected to the greater proportion of the total torque load. In addition, the transverse and/or radial loads on the gears 19a and 19b may be resiliently cushioned by the ability of the separate cushioning elements 28 in one or both of the flexible couplings to be differently compressed and even to be individually non-uniformly compressed from end to end thereof due to canting of the outer sleeves 27a of the couplings on the shaft 20. At the same time the total complex loading is transmitted to and carried by the common input shaft 20. However, any sudden changes or increases in the character or magnitude of the total load, i.e. from shock loads, are cushioned and partially absorbed by the two sides of the dual drive mechanism in substantially the proportion by which they share the total shock load.

Because of the specific design of the drive shaft of the instant invention, it is theoretically possible to have a difference of as much as about 42° between the amounts of rotation of the two sleeves 27a and 27b relative to the shaft 20. This, of course, does not take place in reality because both of the sleeves are rotated relative to the shaft 20 to a certain extent by whatever steady torque may be developed during digging through uniform ground conditions. Moreover, the stiffness designed into the flexible couplings (according to well known design principles) and the necessary rigidity of the digging wheel and its rotational mounting greatly limit the differences in loading and the consequent differences in rotary deflection of the two sides of the dual drive. Thus, this difference in rotary deflection will normally reach only a few degrees when the invention is applied to a digging machine in the manner illustrated herein.

In other applications of the invention, the difference in rotary deflection of the two sides of the dual drive may more closely approach the theoretical limit mentioned above. In such cases, it will be necessary, in effect, to cut the cushioning elements 28 in half (in the plane of division of the two sleeves 27a and 27b) so as to provide independent sets of shorter cushioning elements within the two sleeves. Also, in this case, as should be apparent, the two sleeves 27a and 27b and their respective sets of cushioning elements may be axially separated any desired distance, using a correspondingly longer, center section 26 on the shaft 20.

Although a particular, preferred form of flexible coupling has been shown and described herein, the invention is not limited thereto, as should be apparent to one skilled in the art. Thus, putting aside questions of cost of the component parts, the portion 26 of the shaft 20 and the sleeves 27a and 27b may preferably, in some instances, have polygonal cross-sectional configurations other than squares, with resulting obvious differences in the number of cushioning elements and in the theoretical maximum deflection obtainable. Examples of three-sided and six-sided designs are also disclosed in the aforementioned U.S. Patent No. 2,712,742 of Hermann J. Neidhart. Other variants of the same basic type of flexible coupling are disclosed in U.S. Patent No. 2,729,442 of Hermann J. Neidhart, granted January 3, 1956.

In addition to the type of flexible couplings disclosed in the aforementioned patents to Hermann J. Neidhart, other basically different coupling designs may be used in accordance with the present invention, although the particular designs mentioned above are preferred, both from the standpoint of cost and operating characteristics, for practically all applications of the present invention which are likely to be encountered in the broad field of torque transmission. Nevertheless, a variety of other forms of flexible couplings are capable of being used in accordance with the general principles of the present invention, and illustrative examples of other coupling designs appear in the following U.S. Patents: No. 2,388,450, granted November 6, 1945, to Glenn S. Thompson; No. 2,363,469, granted November 21, 1944, to Max Goldschmidt; No. 2,189,870, granted February 13, 1940, to Nicolaas Sluyter; No. 1,746,217, granted February 4, 1930, to Axel J. Jansson; No. 1,646,427, granted October 25, 1927, to Benjamin Skikmore, Jr.; No. 1,633,580, granted June 28, 1927, to Charles Froesch; No. 1,590,055, granted June 22, 1926, to William E. Porter; and No. 1,425,616, granted August 15, 1922, to Gurdon L. Tarbox. All of these different flexible coupling designs have their own peculiar performance characteristics which affect their suitability for particular applications, in respects which should be well understood by one skilled in the art. In general, considerations of durability of the elastic cushions dictate a preference for a flexible coupling design in which the elastic cushions are subjected essentially only to compresssion loading.

Whereas, for simplicity and economy of construction, the present invention is described with reference to an embodiment thereof in which the inner driven member of both of the required pair of flexible couplings is a member common to both of these couplings and constitutes a single power input shaft for supplying power to the dual drive mechanism, it will also be appreciated by those skilled in the art that the invention is not limited in this regard. Obviously, any desired number and types of torque transmitting components may be interposed between the two flexible couplings and any common source of power thereto, as may be dictated by design considerations peculiar to any particular application of the present invention.

From the foregoing description of the present invention as applied to an illustrative application and embodiment thereof, and from the types of variations thereof which have been specifically mentioned, by way of examples, it will be apparent that a novel, dual drive principle has been disclosed which is capable of wide variation while accomplishing the general objectives and achieving the advantages also set forth above. Accordingly, it is intended that all such variations of the invention shall be included, as may be permitted by the scope of the appended claims.

What is claimed is:

1. A dual drive mechanism and ditching wheel assembly comprising a frame, a power input shaft journaled adjacent its opposite ends in support bearings carried by said frame, a pair of axially aligned sleeves coaxially mounted on said shaft and surrounding the same for independent rotation relative to the shaft about their common axis, separate resilient cushioning means respectively interposed and acting between the shaft and the two sleeves for independently and resiliently restraining rotation of the sleeves relative to the shaft and independently and resiliently maintaining concentricity of the sleeves and the shaft, a pair of torque transmitting drives respectively connected to said sleeves, a ditching wheel having spaced peripheral scoops and being mounted on said frame between said torque transmitting drives for rotation about an axis parallel to said common axis, and means connecting said torque transmitting drives, respectively, in driving relationship with said ditching wheel at opposite sides thereof.

2. The assembly of claim 1 in which each of said sleeves has a regular polygonal inner cross-section and the portions of said power input shaft surrounded by said sleeves have similar polygonal cross-sections, and said resilient cushioning means comprise a plurality of cylindrical rods of elastic rubber-like material normally disposed under radial compression between plane surfaces of said power input shaft and apices between plane inner surfaces of said sleeves.

3. The dual drive mechanism of claim 1 in which each of said sleeves has a regular polygonal inner cross-section and the portions of said power input shaft surrounded by said sleeves have similar polygonal cross-sections with plane surfaces thereof normally oriented to face radially outwardly toward the apices between inner plane surfaces of said outer sleeves, and said resilient cushioning means comprise cylindrical rods of elastic, rubber-like material normally disposed under radial compression between said plane surfaces of the inner shaft and said apices of the outer sleeves.

4. The assembly of claim 3 in which each of said cylindrical rods of elastic, rubber-like material extends continuously through both of said sleeves from adjacent opposite ends thereof so that the same cylindrical rods provide resilient restraint against rotation of said sleeves relative to each other and to said shaft and lateral displacement of the axes of said sleeves relative to the axis of said shaft.

5. A dual drive mechanism comprising a rotary power input shaft; a pair of flexible couplings, each comprising a rotary power input element, a rotary power output element, and resilient cushioning means interposed between said input and output elements for yieldingly transmitting torque from the former to the latter; a common driven member; means connecting said power input shaft to the power input element of both of said flexible couplings for driving them in rotation; and means connecting the power output element of said flexible couplings to said common driven member for driving the same in rotation; the power input element of each of said flexible couplings being an inner shaft having a regular polygonal cross-section and the power output element of each of said flexible couplings being an outer sleeve normally coaxially disposed about said inner shaft and having a similar, regular polygonal, interior cross-section, the inner shaft having its plane surfaces normally oriented to face the apices between inner plane surfaces of said outer sleeve, and said resilient coupling means of each of said flexible couplings comprising cylindrical rods of elastic, rubber-like material normally disposed under radial compression between said plane surfaces of the inner shaft and said apices of the outer sleeve of that flexible coupling.

6. A dual drive mechanism according to claim 5 in which the inner shaft of said flexible couplings and said rotary power input shaft are integral, coaxial portions of a single rotary shaft, and said cylindrical rods of each resilient coupling are integrally formed extensions, respectively, of said cylindrical rods of the other flexible coupling.

7. A dual drive mechanism for a large, rotary, wheel-like member that encounters shock loads resisting rotation thereof and applied thereto other than in a truly tangential or circumferential manner, the size and mounting of said rotary member being such that said shock loads tend to distort the same and deflect it from alignment with a normal, fixed axis of rotation, said mechanism comprising a frame, means mounting said rotary member on said frame for rotation about a first axis, a power input shaft mounted on said frame for rotation about a second axis parallel to said first axis, a pair of sleeves coaxially disposed about said shaft and surrounding the same for independent rotation relative thereto and independent movement out of concentricity therewith, a plurality of separate, resilient cushioning means respectively interposed and acting between the two sleeves and said shaft for resiliently restraining rotation thereof about said second axis relative to said shaft and to each other and for resiliently constraining said sleeves in coaxial relationship with each other and said shaft, a pair of torque transmitting drive members respectively mounted on said sleeves for rotation therewith, and means connecting said drive members, respectively, in rotary driving relationship with axially opposite sides of said rotary member, whereby said sleeves and drive members mounted thereon are resiliently cushioned against independent rotation relative to each other and to said shaft and against deflection out of concentricity with said shaft when driving said rotary member in opposition to said shock loads applied thereto.

8. The dual drive mechanism of claim 7 in which each of said sleeves has a regular polygonal inner cross-section and the portions of said power input shaft surrouned by said sleeves have similar polygonal cross-sections, and said resilient cushioning means comprise a plurality of cylindrical rods of elastic, rubber-like material normally disposed under radial compression between plane surfaces of said power input shaft and apices between plane inner surfaces of said sleeves.

References Cited by the Examiner

UNITED STATES PATENTS

| 496,330 | 4/93 | Depoele. | |
|---|---|---|---|
| 1,070,589 | 8/13 | Duffing | 74—444 |
| 1,225,355 | 5/17 | Pogue | 74—440 |
| 2,423,132 | 7/47 | Vaughn | 37—97 |
| 2,576,281 | 11/51 | Carr. | |
| 2,712,742 | 7/55 | Neidhart | 64—14 |

FOREIGN PATENTS

| 26,165 | 1911 | Great Britain. |
|---|---|---|
| 585,399 | 2/47 | Great Britain. |

BROUGHTON G. DURHAM, *Primary Examiner.*

ROBERT C. RIORDON, *Examiner.*